United States Patent
Idikurt et al.

(10) Patent No.: US 10,673,053 B2
(45) Date of Patent: Jun. 2, 2020

(54) CONNECTOR SYSTEM, BATTERY MODULE, METHOD FOR FORMING A TAP, AND OPERATING DEVICE

(71) Applicant: Bayerische Motoren Werke Aktiengesellschaft, Munich (DE)

(72) Inventors: Tuncay Idikurt, Munich (DE); Philip Kotter, Munich (DE); Alexander Muck, Munich (DE); Christian Zachar, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 15/988,294

(22) Filed: May 24, 2018

(65) Prior Publication Data

US 2018/0269456 A1   Sep. 20, 2018

Related U.S. Application Data

(63) Continuation of application No. PCT/EP2016/080868, filed on Dec. 14, 2016.

(30) Foreign Application Priority Data

Jan. 25, 2016   (DE) .................. 10 2016 200 961

(51) Int. Cl.
*H01M 2/20* (2006.01)
*H01M 2/10* (2006.01)
(Continued)

(52) U.S. Cl.
CPC ............ *H01M 2/206* (2013.01); *B60L 50/50* (2019.02); *H01M 2/1077* (2013.01); *H01R 11/288* (2013.01); *H01M 2220/20* (2013.01)

(58) Field of Classification Search
None
See application file for complete search history.

(56) References Cited

U.S. PATENT DOCUMENTS

2011/0151305 A1   6/2011   Bolze et al.
2011/0302773 A1*  12/2011  Chattot ............... H01M 2/1077
                                                        29/729
(Continued)

FOREIGN PATENT DOCUMENTS

DE   10 2008 034 871 A1   1/2010
DE   10 2009 050 316 A1   4/2011
(Continued)

OTHER PUBLICATIONS

DE-102012002355-A1 machine English translation (Year: 2012).*
(Continued)

*Primary Examiner* — Scott J. Chmielecki
(74) *Attorney, Agent, or Firm* — Crowell & Moring LLP (57) ABSTRACT

A connector system for a battery module has a number of cell connectors of different successive cell connector types in order to form one or more electric contacts with one or more connections of one or more individual cells of the battery module, in particular for a power-transmitting tap in which each cell connector of a subsequent cell connector type is designed to electrically connect a larger number of connections of individual cells than the number of connections which can be connected by each cell connector of a preceding cell connector type. Each cell connector of a preceding cell connector type can be stacked and/or nested on a cell connector of a subsequent cell connector type in an assembly direction perpendicular to the main direction of extension.

16 Claims, 8 Drawing Sheets

(51) Int. Cl.
*B60L 50/50* (2019.01)
*H01R 11/28* (2006.01)

(56) References Cited

U.S. PATENT DOCUMENTS

2012/0276431 A1    11/2012   Groshert et al.
2014/0069690 A1*   3/2014   Diez .................... H01M 2/202
                                                                                   174/126.1

FOREIGN PATENT DOCUMENTS

DE     10 2011 076 624 A1    11/2012
DE     10 2012 002 355 A1     8/2013
DE        102012002355 A1 *   8/2013  ......... H01M 2/1077
DE     10 2014 210 327 A1    12/2015
EP           2 720 320 A1     4/2014

OTHER PUBLICATIONS

International Search Report (PCT/ISA/210) issued in PCT Application No. PCT/EP2016/080868 dated Feb. 10, 2017 with English translation (seven pages).
German-language Written Opinion (PCT/ISA/237) issued in PCT Application No. PCT/EP2016/080868 dated Feb. 10, 2017 (seven pages).
German-language Search Report issued in counterpart German Application No. 10 2016 200 961.3 dated Nov. 16, 2016 with partial English translation (13 pages).

* cited by examiner

CONNECTOR SYSTEM, BATTERY MODULE, METHOD FOR FORMING A TAP, AND OPERATING DEVICE

CROSS REFERENCE TO RELATED APPLICATIONS

This application is a continuation of PCT International Application No. PCT/EP2016/080868, filed Dec. 14, 2016, which claims priority under 35 U.S.C. § 119 from German Patent Application No. 10 2016 200 961.3, filed Jan. 25, 2016, the entire disclosures of which are herein expressly incorporated by reference.

BACKGROUND AND SUMMARY OF THE INVENTION

The present invention relates to a connector system, a battery module, a method for forming a tap and an operating device. The present invention specifically relates to a connector system for a battery module, a battery module for an electric or hybrid vehicle, a method for forming a power-transmitting tap on a battery module, and an electric or hybrid vehicle.

In the field of vehicle technology, but also in other working or operating devices, battery modules comprised of a plurality of individual cells are increasingly employed for the supply of energy. In addition to electrical contacts for one or more terminals of one or more individual cells of the battery module, which execute an instrument and/or control tap-off function, electrical and power-transmitting taps for the supply of electrical energy to a fundamental operating unit of a working or operating device are of particular interest. The cell connectors employed for this purpose are exposed to particular thermal and/or mechanical loading, and in particular to alternating loads.

Firstly, in consideration of electrical conductivity, high-quality materials must be used, which are associated with corresponding costs. Secondly, the cell connectors used must also be capable of accommodating or compensating thermo-mechanical loading associated, for example, with alternating loads and the resulting variations in volume in the individual cells of a battery module.

The object of the invention is therefore the disclosure of a connector system, a battery module, a method for forming a tap and an operating device wherein, with the minimum possible material complexity in the constitution of contacts for a power-transmitting tap, an exceptionally high degree of reliability is achieved.

The fundamental object of the invention is fulfilled by a connector system, by a battery module, by a method for forming a tap, and by an operating device in accordance with embodiments of the invention.

According to a first aspect of the present invention, a connector system for a battery module is disclosed, comprising a plurality of cell connectors of different successive cell connector types, in order to form one or more electrical contacts with one or more terminals of one or more individual cells of the battery module, in particular for a power-transmitting tap. Each cell connector of a subsequent cell connector type is designed to electrically connect a larger number of terminals of individual cells than the number of terminals which can be connected by each cell connector of a preceding cell connector type. Moreover, each cell connector of a preceding cell connector type can be stacked and/or nested on a cell connector of a subsequent cell connector type in an assembly direction Z, perpendicular to a main direction of extension X. By means of the characteristics according to the invention, the constitution of a power-transmitting tap for a plurality of individual cells in a battery module having a plurality of cell connectors in a cascading arrangement is possible. This means that, by the stacking one on top of another and/or nesting of cell connectors of different cell connector types in a multi-layer arrangement at the desired location, for example in the vicinity of the power-transmitting tap, the maximum transmittable current density can be reinforced by a corresponding increase in the effective conductor cross section. Conversely, for example, in marginal regions of the battery module, the current-carrying capability of a small number of mutually stacked cell connectors, or even of a single cell connector, is sufficient. By means of a corresponding combination of different cell connectors of different types, any tap configuration required can be achieved, with a high degree of reliability and reduced material complexity.

An exceptionally high saving of material in the constitution of power-transmitting taps is achieved wherein, according to a preferred form of embodiment of the connector system according to the invention, the latter comprises a number n of different successive cell connector types, and each cell connector of a cell connector type j—where j is a number from 1 to n—is designed to electrically connect a plurality of 2j terminals of individual cells.

In consideration of the technical complexity of production and warehousing, particularly simple conditions can be achieved if each cell connector of a cell connector type j, in the main direction of extension X of the cell connector, comprises—in a specifically linearly-arranged sequence—a plurality of—specifically 2j—contact sections and 2j−1 compensating sections and if, in the main direction of extension of the cell connector, each two successive contact sections in each cell connector are mutually connected by a compensating section.

According to another further development of the connector system according to the invention, further advantages with respect to assembly and handling are achieved if the contact sections of the cell connectors of a given cell connector type, and specifically of all the cell connector types, are of the same design, and specifically are configured as a planar plate structure, of trapezoidal form, of a combined trapezoidal and rectangular form, or of rectangular form, having a long side arranged along the main direction of extension X of the cell connector and/or a short side arranged along a secondary direction of extension Y, orthogonally to the main direction of extension X of the cell connector and to the assembly direction Z.

Although the individual cell connectors of a cell connector type can be adapted to specific geometrical requirements of the individual cells, of the terminals and/or of the module, according to the application thereof, in the interests of economization in the basic manufacturing process and in assembly, it is particularly advantageous if the compensating sections of the cell connectors of a cell connector type are configured as identical, symmetrical and/or of mutually similar shape.

The internal integrity of mutually stackable cell connectors of different cell connector types, and reliability in response to alternating thermal loads can be achieved or further enhanced if, according to another further development of the connector system according to the invention, the cell connectors of different cell connector types are configured with a mutually similar shape, such that a compensating section of a cell connector of a preceding cell connector type can be at least partially accommodated in a compensating section of a cell connector of a subsequent cell connector type.

In order to permit the particularly reliable accommodation and/or compensation of alternating thermal loads, in another further development of the connector system according to the invention, it is provided that a respective compensating section—specifically in the main direction of extension X of the cell connector—incorporates or constitutes an elastic element.

In order to permit the mutually stackable arrangement of connectors of different connector types, all cooperating shapes, specifically for compensating sections, are conceivable in principle. However, exceptionally simple conditions are then provided if a respective compensating section is at least partially configured with a wave form or half-wave form, with a U-shape, V-shape or bell shape, convexly on an underside and/or concavely on the upper side of the respective compensating section in the assembly direction Z.

According to a further aspect of the present invention, a battery module is also provided. The latter is configured with a plurality of individual cells, each having first and second terminals and having cell connectors of a connector system according to the invention. Herein, for a power-transmitting tap, electrical contacts are formed with a plurality of terminals of the individual cells of the battery module by means of a plurality of cell connectors of different successive cell connector types in the connector system, wherein each cell connector of a successive cell connector type electrically connects a greater number of terminals of individual cells than the number of terminals which are connected by a respective cell connector of a preceding cell connector type. Moreover, a respective cell connector of a preceding type can be stacked on and/or nested in a cell connector of a subsequent cell connector type, in an assembly direction Z which is perpendicular to the main direction of extension X of the cell connector, or arranged directly in contact with the terminals of individual cells.

Moreover, according to a further aspect of the present invention, a method is provided for forming a power-transmitting tap of a battery module. The battery is comprised of a plurality of individual cells, having terminals. The method comprises the following steps: (A) the provision of cell connectors in a connector system according to the invention, and (B) the formation of electrical contacts with a plurality of terminals on the individual cells of the battery module, by means of a plurality of cell connectors of different successive cell connector types in the connector system. A respective cell connector of a subsequent cell connector type is electrically connected to a larger number of terminals than the number of terminals which are connected by a respective cell connector of a preceding cell connector type. Moreover, a respective cell connector of a preceding cell connector type is stacked on and/or nested in a cell connector of a subsequent cell connector type, or directly contacted with the terminals of individual cells, in an assembly direction Z perpendicular to the main direction of extension X.

According to a further aspect of the present invention, an operating device, and specifically an electric or hybrid vehicle, is provided. The operating device according to the invention is configured with electrical operating means, specifically a drive system. Moreover, a battery module is configured according to the present invention, by means of which the operating means can be supplied with electrical energy.

Other objects, advantages and novel features of the present invention will become apparent from the following detailed description of one or more preferred embodiments when considered in conjunction with the accompanying drawings.

Exemplary embodiments of the invention are described in detail hereinafter, with reference to FIGS. 1 to 16. Identical or equivalent components, or those having an identical or equivalent effect, are identified by the same reference symbols. A detailed description of the elements and components thus identified is not reproduced upon every occurrence thereof.

The characteristics represented, together with further properties, can be mutually isolated in any form required, and mutually combined as required, without departing from the core of the invention.

DETAILED DESCRIPTION OF THE DRAWINGS

Figure 1:
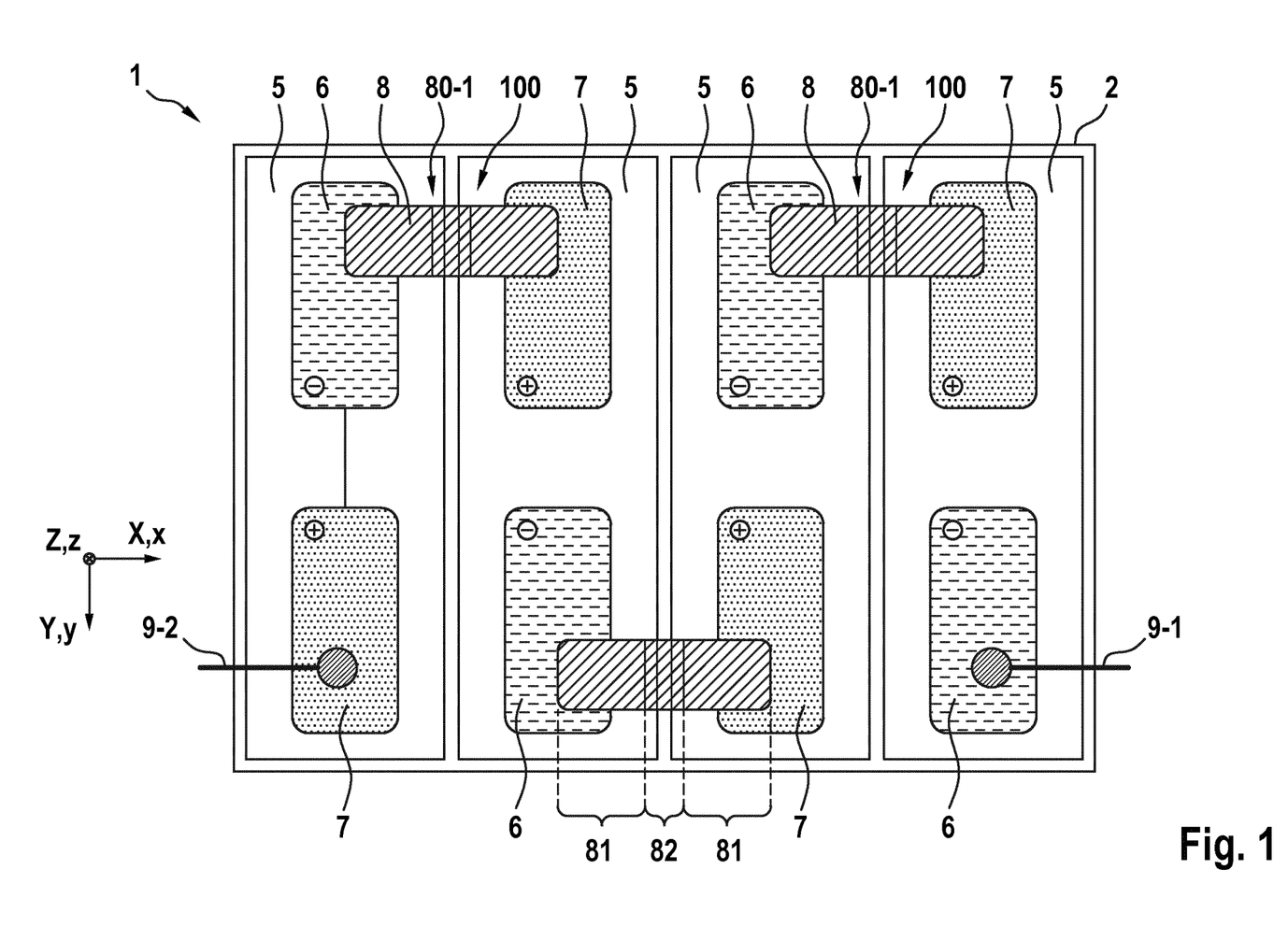
FIGS. 1-5, in a schematic overhead view, and partially in an exploded representation, show a battery module according to the invention, in which embodiments of the cell connector system according to the invention are employed.

FIG. 1 shows a schematic overhead view of one embodiment of a battery module 1, employing an embodiment of the connector system 100 according to the invention.

The battery module represented in FIG. 1 comprises a housing 2, in the interior of which a plurality of individual cells 5 are accommodated. Each individual cell 5 has a first terminal 6, for example a negative pole, and a second terminal 7, for example a positive pole. In the representation according to FIG. 1, the negative pole and the positive pole of directly adjoining individual cells 5 are interconnected in the manner of a series circuit such that, on the first and second module terminals 9-1 or 9-2 provided, the sum of the individual voltages of the individual cells 5 of the battery module 1 can be tapped-off as the operating voltage.

In the embodiment represented in FIG. 1, for the connection of directly mutually adjoining individual cells 5, as cell connectors 8 of the connector system 100 according to the invention, a first cell connector type 80-1 is employed, which is specifically designed to interconnect two directly adjoining individual cells 5, for the purposes of a power transmitting tap-off by means of the first and second module terminals 9-1 and 9-2.

From FIG. 1, it will further be seen that the cell connectors 8 extend in a main or longitudinal direction of extension X, which coincides with the x-axis. In combination with the extension thereof in the secondary direction of extension, or transverse direction Y which, in the embodiment according to FIG. 1, is oriented in parallel with the y-axis, the cell connectors 8 of the first type 80-1, in an overhead view, assume the approximate form of a rectangle.

In this case, all the cell connectors 8 of the first type 80-1 in the connector system 100 are identically configured, and are comprised of first and second contact sections 81, and a compensating section 82 interposed between the latter, by means of which the contact sections 81 are mutually connected. The contact sections 81 themselves are electrically connected with the respective terminals 6 or 7 of the directly mutually adjoining individual cells 5 of the battery module 1, either directly or by the employment of contact devices or mechanisms.

Figure 2:
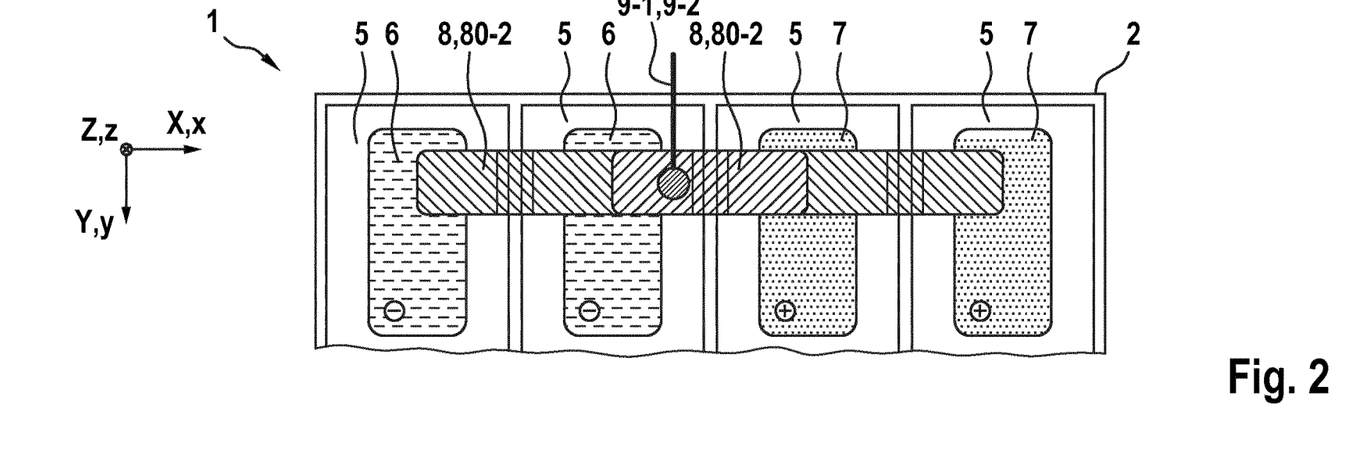
Figure 3:
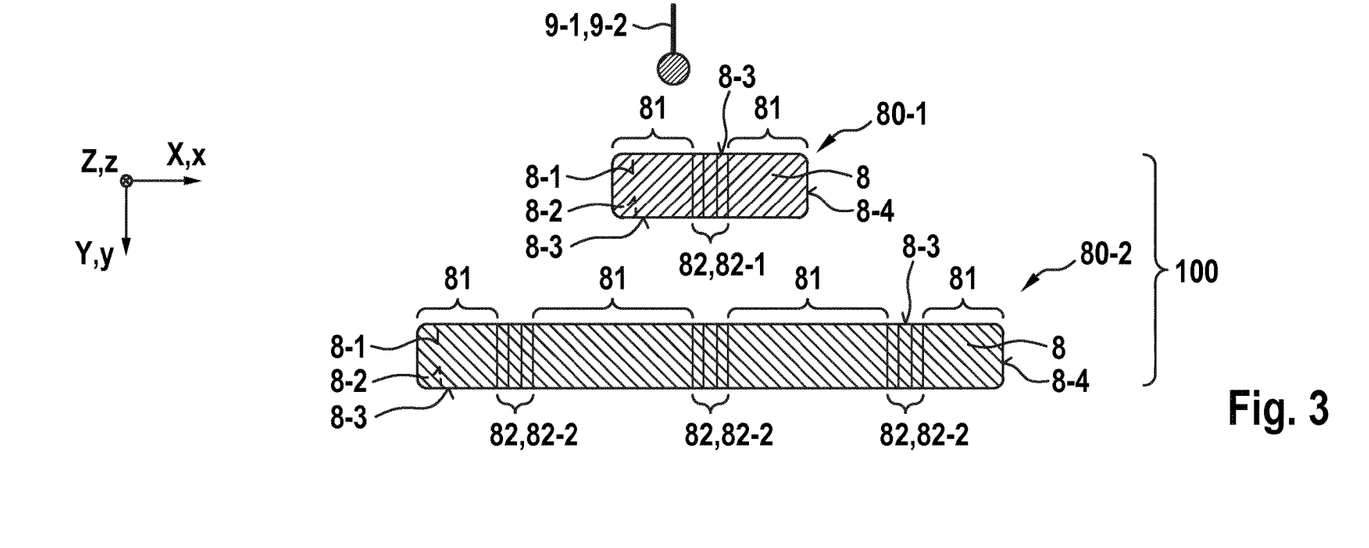

FIGS. 2 and 3, in a schematic overhead view and in an exploded representation respectively, represent a further embodiment of the battery module 1 according to the invention or the configuration of an embodiment of the connector system 100 according to the invention, which can be employed in the battery module 1 from FIG. 2.

The battery module 1 according to the invention represented in FIG. 2 in turn comprises a plurality of individual cells 5. The latter—in comparison with the form of embodiment according to FIG. 1—are oriented such that their two first terminals 6, (or negative poles), are located on one side of the housing 2 of the module 1, and two second terminals 7 (or positive poles) are arranged adjacently thereto. In order to permit the achievement of a parallel tap-off, with a corresponding increase in capacity associated with an increase in the maximum current output, the arrangement according to FIG. 2 employs another form of embodiment of the connector system 100 according to the invention.

In this arrangement, cell connectors 8 of a first type 80-1 and cell connectors 8 of a second type 80-2 are employed.

At the very bottom, and in direct electrical contact with the first terminals 6 and the second terminals 7, cell connectors 8 of the second type 80-2, or of the second form are configured for the bonding of four first or four second terminals 6 or 7 of the four individual cells 5.

As can be seen in conjunction with FIG. 3, the cell connector 8 of the second type 80-2 essentially comprises a rectangular arrangement of planar design, having an upper side 8-1 and an underside 8-2, and having a first or longer edge 8-3 in the main direction of extension X, parallel to the x-axis, and a second or shorter edge 8-4 in the secondary direction of extension, or transverse direction Y, parallel to the y-axis.

The four contact sections 81 for the bonding of the terminals 6 of the individual cells 5 can also be seen. The contact sections 81 are mutually connected by way of compensating sections 82. The cell connectors 8 of the second type 80-2 thus constituted can specifically be of one-piece material design.

The cell connectors 8 of the first cell connector type 80-1 are of similar design to the cell connectors 8 of the second cell connector type 80-2, but are of reduced length in the main direction of extension X and consequently, in the main direction of extension X, can only overlap with the two central terminals of the four first or second terminals 6 or 7 of the individual cells 5, thereby forming a contact.

In the application according to FIG. 2, the cell connectors 8 of the second cell connector type 80-2 are arranged at the very bottom, essentially directly on the first terminals 6 of the individual cells 5. The underside 8-2 of the cell connector 8 of the first cell connector type 80-1 is arranged on the upper side 8-1 of the bottom most cell connector 8 of the second cell connector type 80-2.

To this end, specifically the compensating regions 82 of the second type 82-2 in a cell connector 8 of the second cell connector type 80-2 and the compensating section 82 of the first type 82-1 of the cell connector 8 of the first cell connector type 80-1 are configured to permit the mutual nesting or stacking thereof. This property is further described hereinafter, with reference to the further FIGS. 6 to 13.

For the external tap-off of current, a corresponding first or second module terminal 9-1 or 9-2 is configured, which bonds all the cell connectors 8 and thus, in this case, specifically the cell connectors 8 of the first cell connector type 80-1.

In this application, the single layer of cell connectors 8 of the second cell connector type 80-2 is sufficient for the outermost individual cells 5 of the battery module 1 and the first terminals 6 thereof, as here only the outermost individual cells 5 contribute locally to the overall current density. In the event of an external tap-off via the first or second module terminal 9-1, 9-2 on the outermost individual cells 5, correspondingly, cell connectors 8 of a plurality of cell connector types 80-1, 80-2, 80-3 must be combined in order to carry the current density. Thus, for example, two "halved" or reduced cell connectors 8 in the X-axis, e.g. transected in the Y-axis at the respective compensating section 82 of type 82-2, 82-2, 82-3 of respective cell connectors 80-1, 80-2, 80-3 can be employed for module terminals 9-1 and 9-2.

Further inwards, however, the contribution of the innerlying cells 5 of the battery module to the overall current density of the battery module 1 increases. This therefore results in a localized increase in the anticipated current density which is available for tapping in the central region of the module 1. In this location it is therefore rational, specifically in the region of the first or second module terminals 9-1, 9-2, to constitute a second conductor layer by the provision of a second cell connector 8, namely the cell connector 8 of the first cell connector type 80-1 such that, at this location in the region of the first or second module terminals 9-1, 9-2, the overall current density can be carried by the increased conductor cross section.

Figure 4:
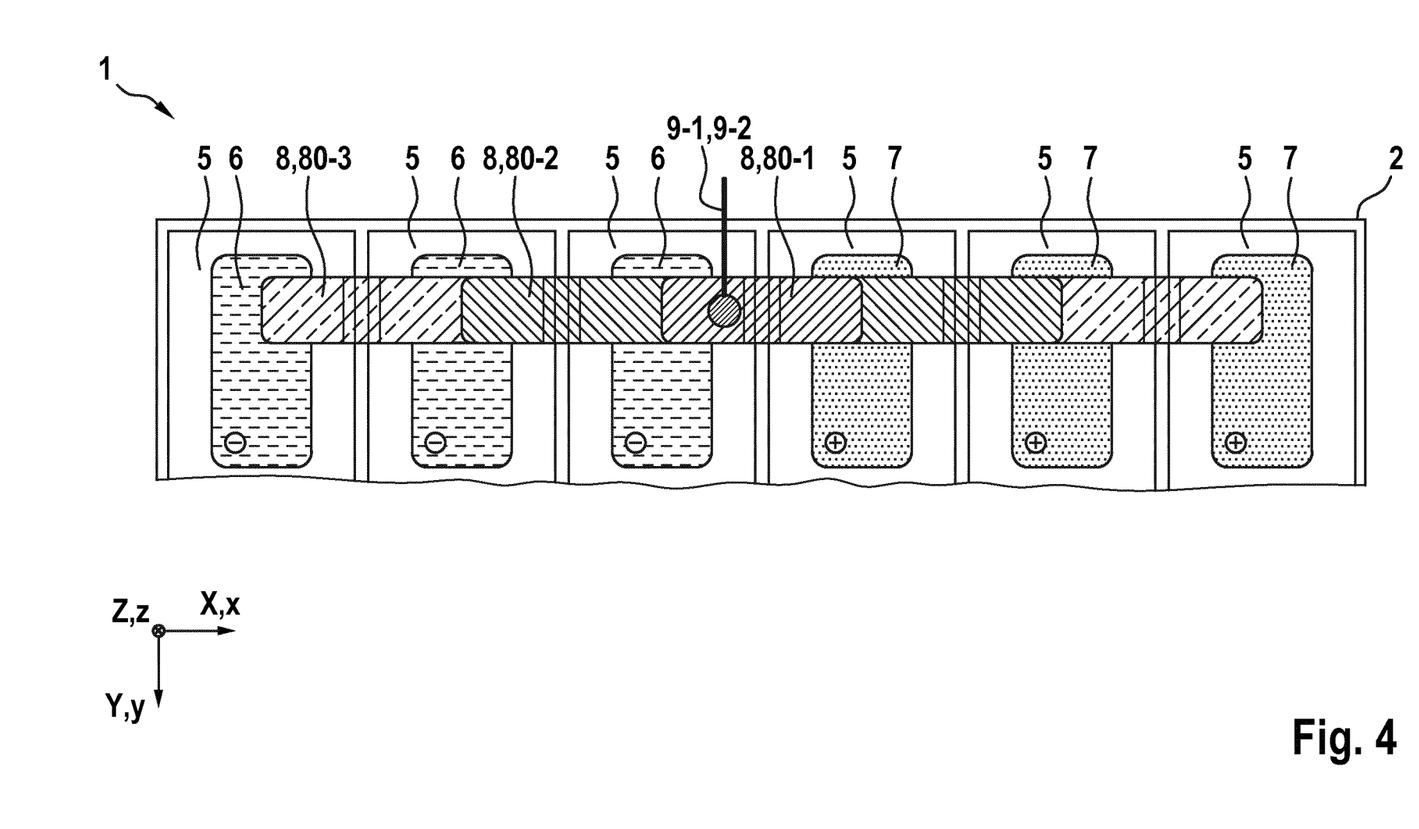
Figure 5:
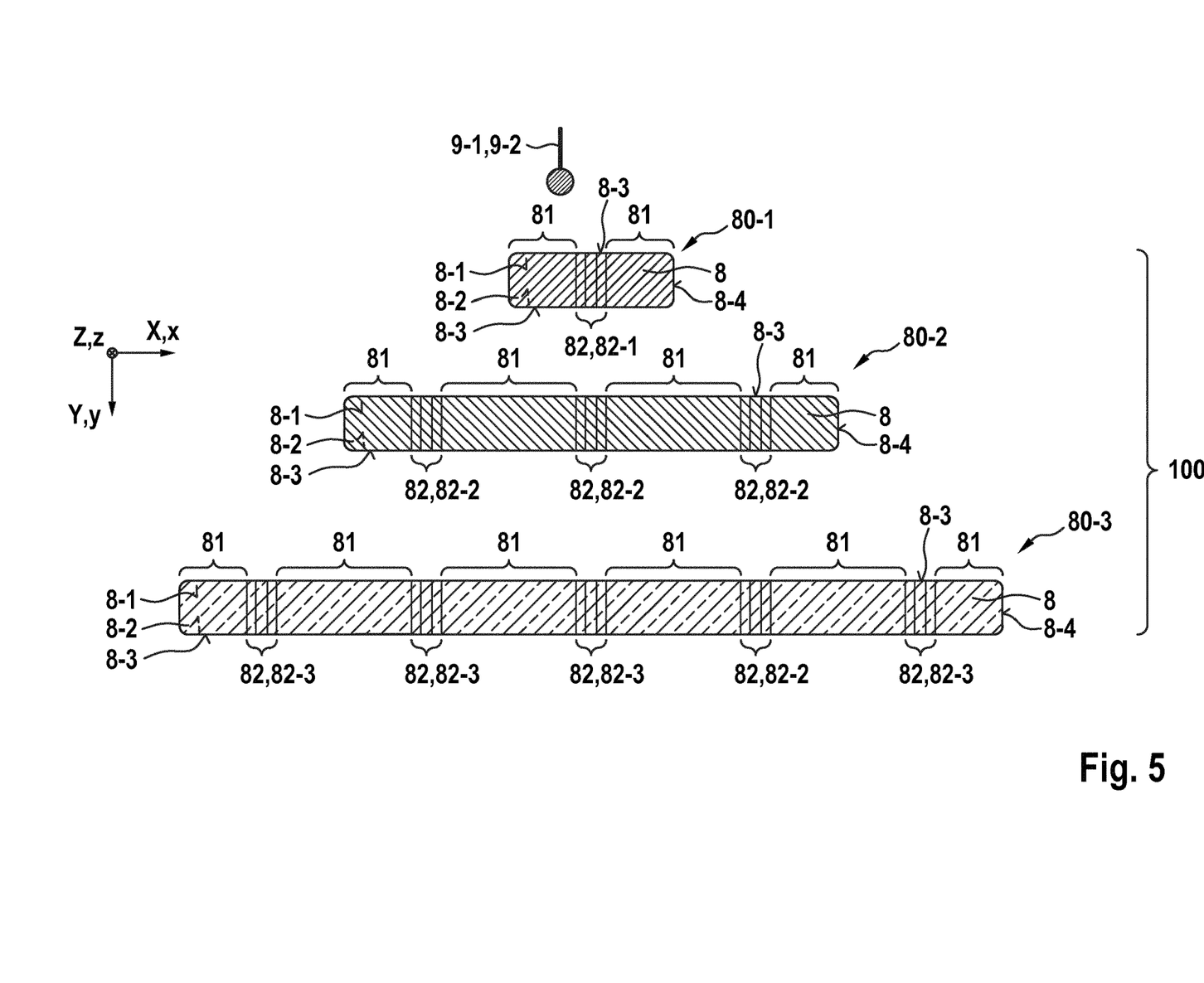

In the form of embodiment according to FIGS. 4 and 5, the situation with respect to the anticipated maximum current density is more acute, wherein the number of layers employed can be further increased in relation to the number represented.

The battery module 1 according to the present invention, represented in FIG. 4, comprises six individual cells 5 with a common tap-off on the first or second module terminal 9-1, 9-2.

At the very bottom, a cell connector 8 of a third cell connector type 80-3 is arranged, having an extension in the main direction of extension X, and permitting a tap-off from the six first or second terminals 6 or 7 of the six individual cells 5 of the battery module 1. The cell connector 8 of the third cell connector type 80-3 lies directly on the first and second terminals 6 or 7 of the individual cells 5 of the module 1.

In an inwardly offset arrangement, from left to right, a cell connector 8 of the second cell connector type 80-2 is arranged, the underside 8-2 of which lies on the upper side 8-1 of the bottom most cell connector 8 of the third type 80-3, and is stacked on, or nested in the latter. As in the form of embodiment represented in FIGS. 2 and 3, the cell connector 8 of the second cell connector type 80-2 incorporates an extension in the main direction of extension X, which permits an overlap with four first or second terminals 6 or 7 of the further inner-lying individual cells 5 of the module 1.

In the top-most position, a cell connector 8 of the first cell connector type 80-1 is arranged, having an extension in the main direction of extension X, which permits an overlap with the central two first or second terminals 6 or 7 of the innermost and directly adjoining individual cells 5 of the module 1. The underside 8-2 of the cell connector 8 of the first cell connector type 8-1 lies upon the upper side 80-1 of the cell connector 8 of the second cell connector type 80-2, and is stacked on or nested in the latter.

In principle, cell connectors 8 are also contemplated which cover and, where applicable, bond an odd number of terminals 6, 7 of individual cells 5, which are arranged directly adjacently to each other in a module 1.

In the exemplary forms of embodiment in FIGS. 1 to 5 discussed here, each cell connector type 80-1, 80-2, 80-3 covers an even number of terminals 6, 7 of directly adjoining individual cells 5, and thus has an even number of first, second or third contact sections 81, which are specifically configured in a mutually identical manner, and an odd number of compensating sections 82 of the first, second or third type 82-1, 82-2, or 82-3.

In order to permit the stackability and/or nesting of cell connectors 8 of different cell connector types 80-1, 80-2, 80-3 arranged directly one on top of another, the corresponding first to third compensating sections 82-1, 82-2 and 82-3 must be configured with mutually-cooperating and/or similar forms, in order to permit the mutual accommodation thereof, one inside another.

Figure 6:
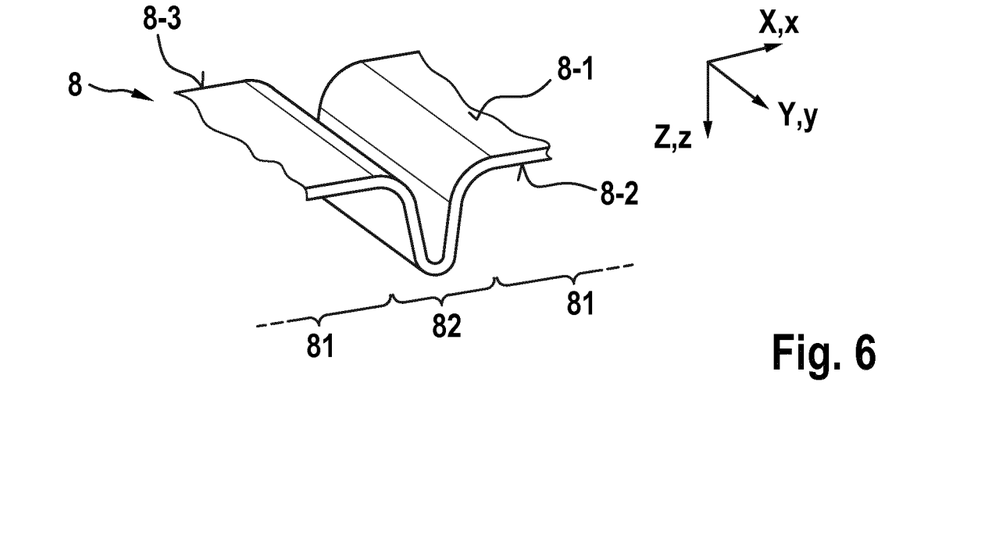
FIGS. 6-11 show a schematic representation of various embodiments of cell connectors, which are constituent elements of the connector system according to the invention.
Figure 7:
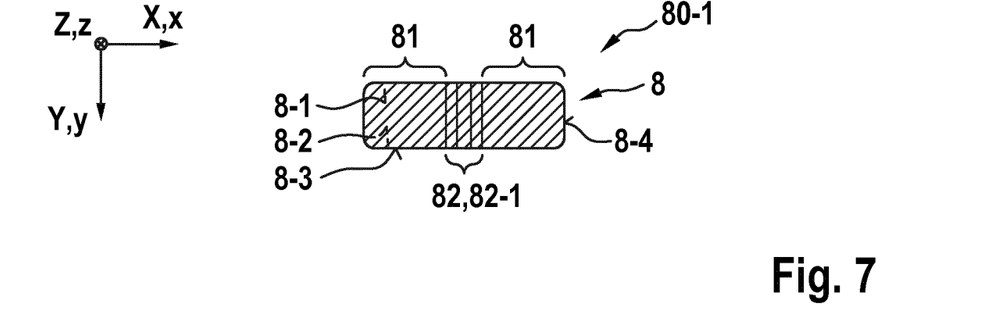
Figure 8:
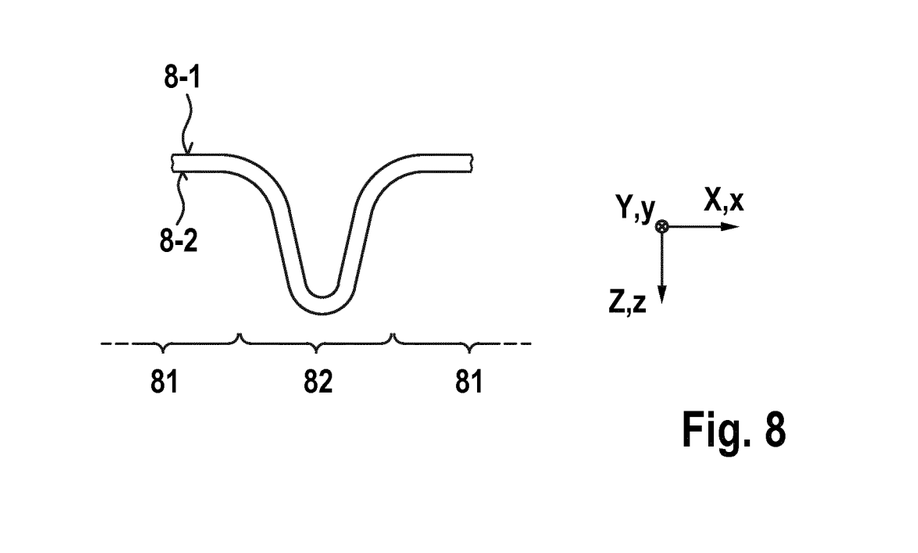

FIGS. 6 to 8 show schematic views of the geometrical details of one embodiment of a cell connector 8, specifically of the first cell connector type 80-1.

Herein, specific reference is made to the geometrical configuration of the compensating section 82-1. Whereas the cell connector 8 assumes the approximate overall shape of a rectangle, having one long side 8-3 in the main direction of extension X, parallel to the x-axis, and a shorter second side 8-4, arranged perpendicularly thereto in the secondary direction of extension, or transverse direction Y, parallel to the y-axis, and thus having a defined upper side 8-1 and underside 8-2, the compensating section 82, configured as a compensating section of the first type 82-1, extends in the assembly direction Z, parallel to the z-axis, in the form of a half-wave, a U-shape or a rounded V-shape. This geometrical configuration of the compensating section 82 provides a degree of elasticity in the xy-plane, and specifically in the x-axis, by means of which the volume work of directly mutually adjoining individual cells 5, associated with alternating thermal loads, operating loads or expansions, can be accommodated, such that any fracture or failure of contact bonds with the terminals 6, 7 of the individual cells is prevented.

Figure 9:
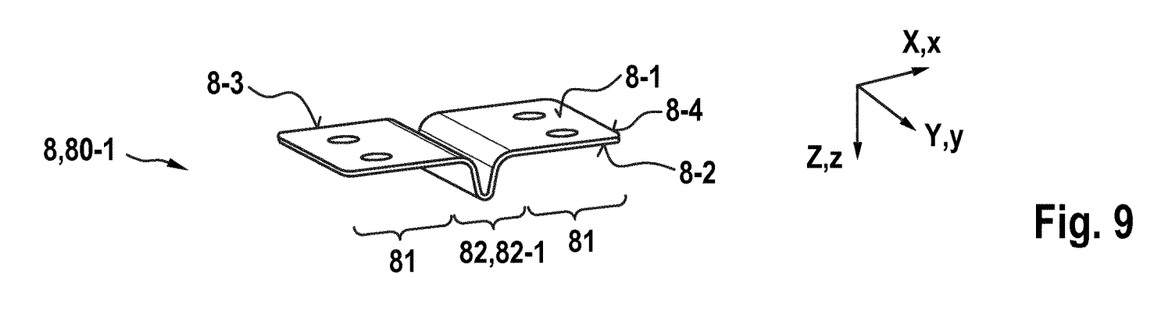
Figure 10:
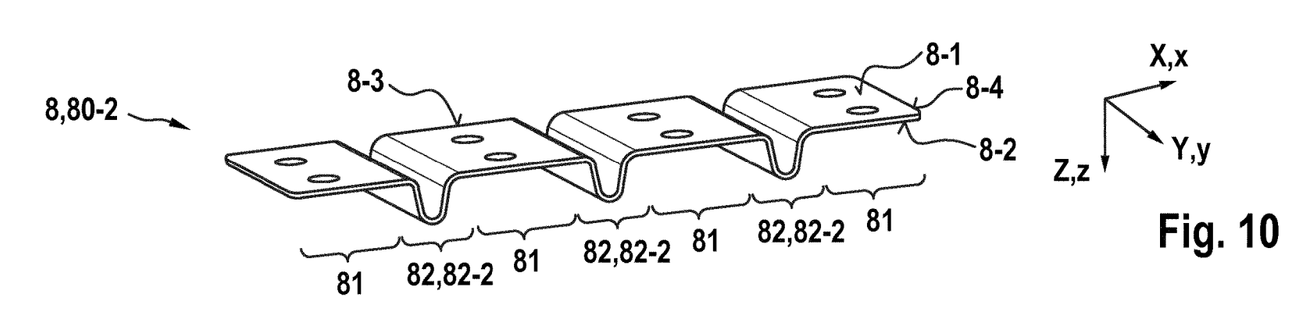
Figure 11:
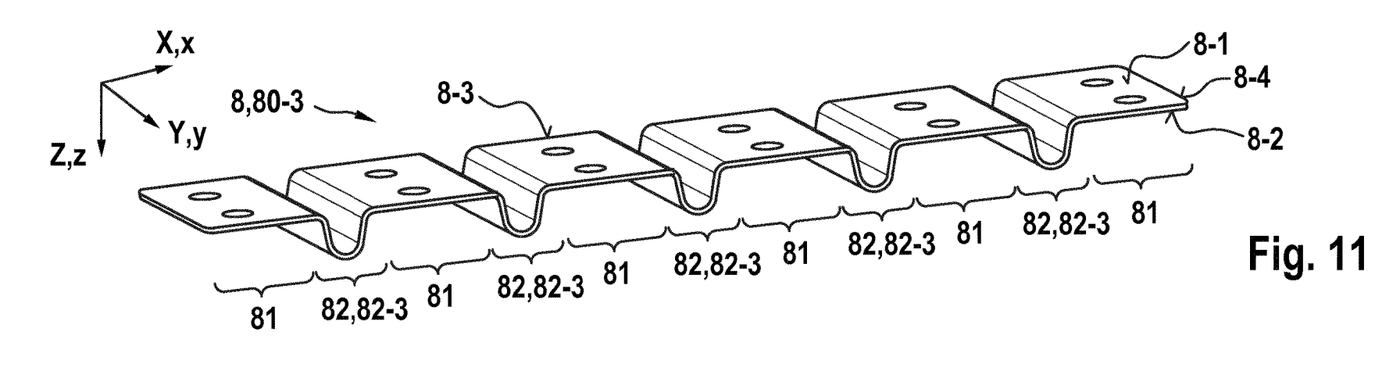

FIGS. 9 to 11, in schematic and perspective side views, show corresponding details of cell connectors 8 of the first, second and third cell connector type 80-1, 80-2 or 80-3.

A noteworthy feature herein is the geometrical configuration of the respective compensating sections 82 of the first, second and third types 82-1, 82-2 and 82-3 in FIG. 9, 10 or 11 which, in this sequence, i.e. in conjunction with higher cell connector types 80-1, 80-2, 80-3, incorporate both a larger lateral extension in the x-axis, and a larger vertical extension in the assembly direction Z, in order to permit the mutual nesting of directly mutually overlying cell connectors 8 of the third, second and first cell connector types 80-3, 80-2 or 80-1, in this sequence, with contact sections 81 which are arranged directly thereupon.

Figure 12:
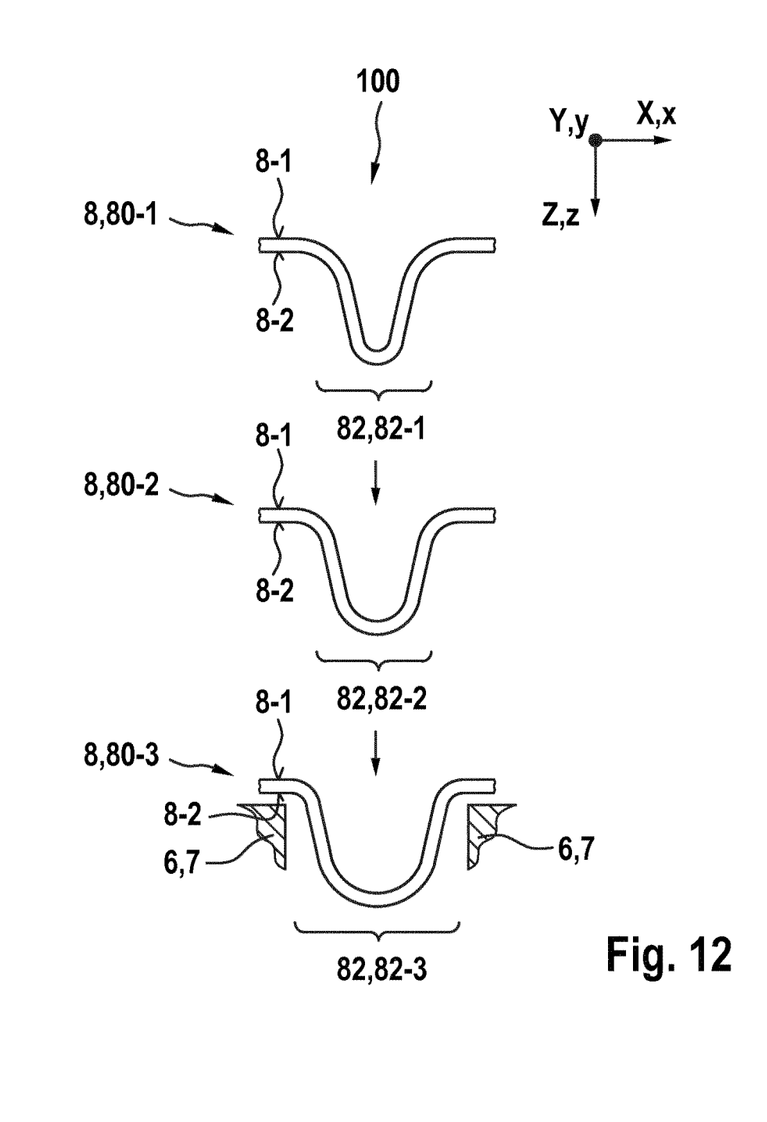
FIGS. 12 and 13, in a schematic side view, show two different assembly states, which are achieved by the employment of an embodiment of the connector system according to the invention.
Figure 13:
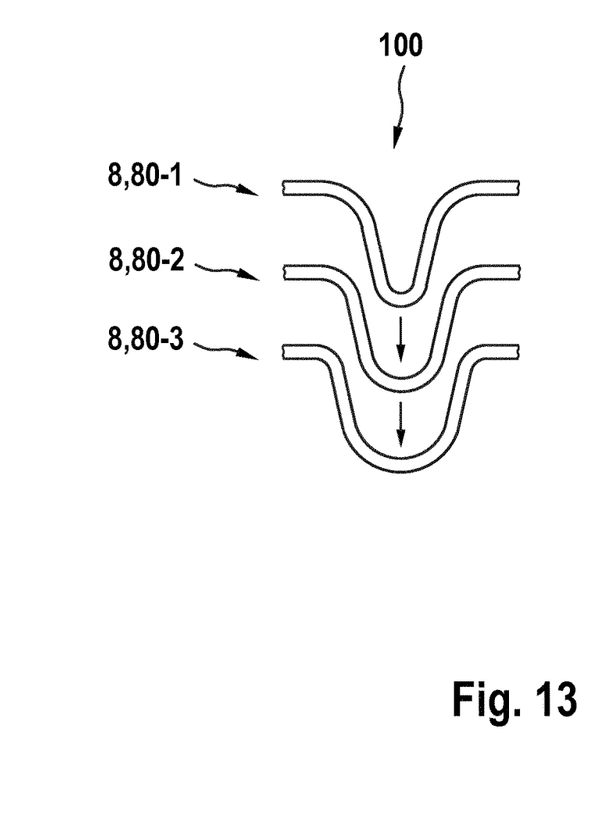

The process of mutual nesting or mutual overlying is again represented with respect to FIGS. 12 and 13, in a schematic side view.

Figure 14:
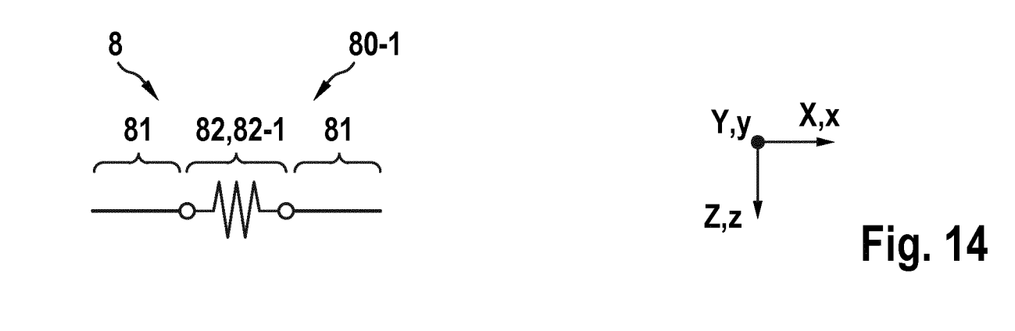
FIGS. 14-16, in a schematic side view, illustrate mechanical aspects of cell connectors in an embodiment of the connector system according to the invention.
Figure 15:
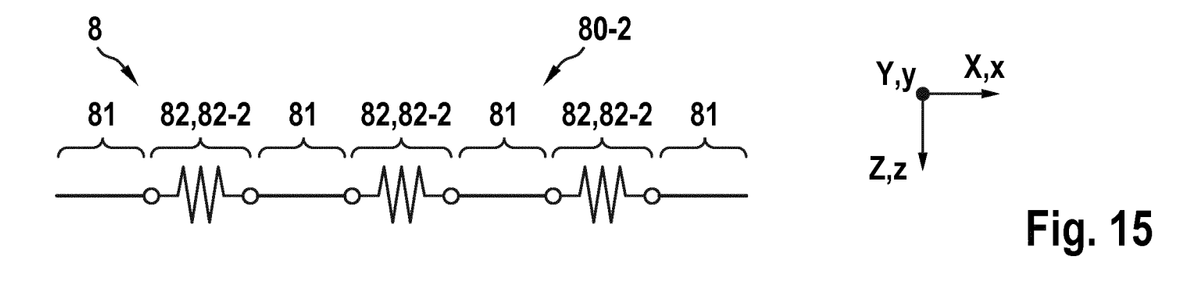
Figure 16:
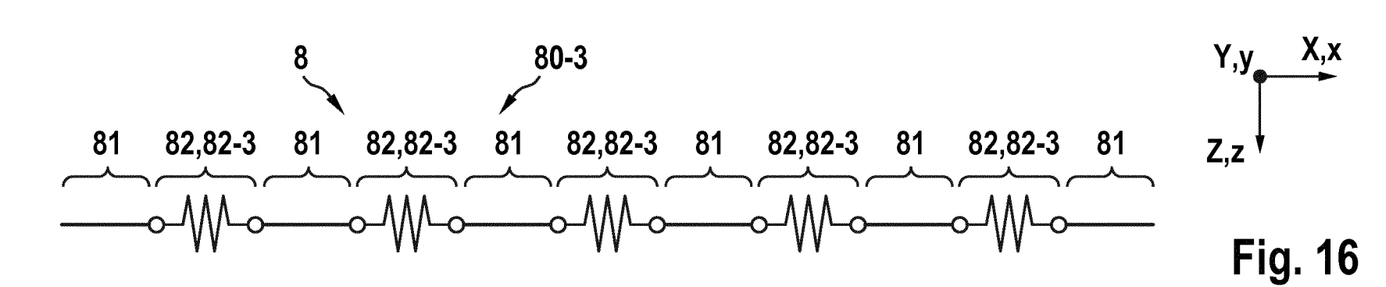

FIGS. 14, 15 and 16 represent the mechanical core elements of cell connectors 8 of the first, second and third cell connector types 80-1, 80-2 and 80-3 in one form of embodiment of the connector system 100 according to the invention.

Herein, the contact sections 81 are essentially mechanically rigid, and the function thereof is to bond with the terminals 6 or 7 of the individual cells 5 of the module 1.

For the accommodation of alternating thermal loads, as a result of their design, the compensating sections 82 of the first, second and third types 82-1, 82-2 or 82-3 possess elastic properties, which are symbolized in FIGS. 14 to 16 by a corresponding spring element.

This aspect, and further aspects of the present invention, are further clarified by the statements set out below.

Conventionally, cell connectors are designed on a project-specific basis for one particular configuration of a battery module. In most cases, single-layer cell connectors are employed. Full-surface cell connectors can also be configured with a multi-layer design. To date, higher-grade parallel circuits of prismatic cell formats have rarely been employed.

Single-layer cell connectors are associated with the application of high forces to the connections or terminals of the individual cells of a module.

Multi-layer cell connectors are associated with high costs. Specifically, full-surface multi-layer cell connectors provide a large conductive cross sectional area wherein, in consideration of the current densities arising, smaller cross sectional areas would be sufficient.

Assembly costs are also relevant, as tooling of equivalent magnitude is required for each layer.

One aspect of the invention is the provision of a design for a cell connector comprised of a kit of parts for the constitution of a plurality of cell circuits, e.g. parallel circuits, by the stacking of identical components. One aspect is the employment of thin-layer cell connectors 8 which, in accordance with the "nested doll" principle—specifically in their compensating sections 82—can be arranged one inside another.

It is thus possible to provide the requisite localized conductor cross section, in accordance with the respective requirements and causes considered.

The core measures involved are the provision of a standardization strategy, and the simultaneous provision of flexible, multi-layer connectors 8. This results in a reduction of the loads applied to the terminals 6, 7 or contacts of the individual cells 5, as the load acting on the terminals 6, 7 is only applied by one layer respectively, for example, whereas three layers, shafts or compensating sections 82 are present to the left of the terminal 6, 7, only two are present to the right of the terminal 6, 7. By the cancellation of the resulting forces, only those associated with a single shaft or a single compensating element 82 apply.

A further advantage is the saving of material, and the consequent reduction of costs.

The size of the tooling employed is causally matched to the current flux, and is thus smaller than customarily required.

As the invention is defined for any preferred, but fixed numbers of individual cells 5 and thus of first terminals 6, or positive poles, and second terminals 7, or negative poles, to be connected, the exemplary embodiments represented in the figures, incorporating 4 or 6 cells, and the specific interconnection thereof, constitute examples only, and the concept of the invention is not restricted thereto.

In general, for a number n of individual cells 5 installed in a module 1, a respective number p of individual cells 5 are interconnected in parallel as a group, and a number s of groups are then interconnected in series, such that the relationship n=s·p applies.

A "8s2p" module thus contains 16 cells, which are interconnected in parallel pairs, and generate a module voltage level of 8 serial cells. In this case, s−1 cell connectors of type 80-*p* are still required, together with two module terminals 9-1 or 9-2.

The module terminals 9-1, 9-2 can be configured similarly to the cell connectors 8 on the grounds that, in parallel circuits, they are required to fulfil the same thermo-mechanical requirements as the cell connectors 8.

Theoretically, up to n cells can be interconnected in parallel.

Two "halved" or shortened cell connectors 8 in the x-axis, e.g. transected at the type 82-*p* compensating element 82, of type 80-*p*, where p=n, can be employed as the module terminals 9-1 and 9-2.

LIST OF REFERENCE SYMBOLS

| | |
|---|---|
| 1 | Battery module |
| 2 | Housing |
| 5 | Individual cell |
| 6 | (First) terminal, negative pole |
| 7 | (Second) terminal, positive pole |
| 8 | Cell connector |
| 8-1 | Upper side |
| 8-2 | Underside |
| 8-3 | Long edge, longitudinal edge |
| 8-4 | Short edge, transverse edge |
| 9-1 | First module terminal/current tap |
| 9-2 | Second module terminal/current tap |
| 11 | First contact (from below) |
| 12 | Second contact (from above) |
| 80-1 | First cell connector type |
| 80-2 | Second cell connector type |
| 80-3 | Third cell connector type |
| 81 | Contact section |
| 82 | Compensating section |
| 82-1 | First compensating section |
| 82-2 | Second compensating section |
| 82-3 | Third compensating section |
| 100 | Cell connector system, cell connector assembly |
| x | Spatial direction |
| X | Main direction of extension |
| y | Spatial direction |
| Y | Secondary direction of extension |
| z | Spatial direction |
| Z | Assembly direction, direction of arrangement |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connector system for a battery module, comprising:
   a plurality of modular nesting cell connectors, each having a common extension direction, and each being of a connector type from among different connector types, the connector types including:
   an n-th connector type configured to electrically connect terminals of 2n successive cells, where n is a positive integer,
   an m-th connector type configured to electrically connect terminals of 2m successive cells, where m is a positive integer greater than n,
   wherein cell connectors of the n-th connector type are nestable on top of cell connectors of the m-th connector type in an assembly direction perpendicular to the extension direction, and
   wherein the plurality of cell connectors includes a first connector configured to electrically connect terminals of exactly two successive cells, the first connector having a module terminal that provides a common power-transmitting tap via nesting of the plurality of cell connectors.

2. The connector system as claimed in claim 1, wherein cell connectors of the n-th and m-th connector types respectively include 2n and 2m terminal contact sections linearly arrayed in the extension direction each two successive terminal contact sections being connected by an intervening compensating section.

3. The connector system as claimed in claim 2,
   wherein the contact sections are planar plate structures,
   wherein the contact sections are of at least one of: trapezoidal and rectangular form, and
   wherein the contact sections have at least one of: a long side arranged along the extension direction, and a short side arranged along a secondary extension direction that is orthogonal, to the extension direction and to the assembly direction.

4. The connector system as claimed in claim 1,
   wherein the contact sections are planar plate structures,
   wherein the contact sections are of at least one of: trapezoidal and rectangular form, and
   wherein the contact sections have at least one of: a long side arranged along the extension direction, and a short side arranged along a secondary extension direction that is orthogonal, to the extension direction and to the assembly direction.

5. The connector system as claimed in claim 2, wherein the compensating sections of the cell connectors of each connector type are identical, symmetrical and/or of mutually similar shape.

6. The connector system as claimed in claim 3, wherein the compensating sections of the cell connectors of each connector type are identical, symmetrical and/or of mutually similar shape.

7. The connector system as claimed in claim 2, wherein the compensating sections of cell connectors of the n-th connector type are of a mutually similar shape with the compensating sections of cell connectors of the m-th connector type, such that the compensating sections of cell connectors of the n-th a preceding cell connector type is are at least partially accommodated in the compensating sections of cell connectors of the m-th connector type.

8. The connector system as claimed in claim 6, wherein the compensating sections of cell connectors of the n-th connector type are of a mutually similar shape with the compensating sections of cell connectors of the m-th connector type, such that the compensating sections of cell connectors of the n-th connector type is are at least partially accommodated in the compensating sections of cell connectors of the m-th connector type.

9. The connector system as claimed in claim 2, wherein the compensating sections comprise an elastic element.

10. The connector system as claimed in claim 8, wherein the compensating sections comprise an elastic element.

11. The connector system as claimed in claim 2, wherein the compensating sections is at least partially include a wave form or half-wave form, with a U-shape, V-shape or bell shape, convexly on an underside and/or concavely on the upper side of the compensating sections in the assembly direction.

12. The connector system as claimed in claim 9, wherein the compensating sections is at least partially include a wave form or half-wave form, with a U-shape, V-shape or bell shape, convexly on an underside and/or concavely on the upper side of the respective compensating sections in the assembly direction.

13. A battery module, comprising:
a plurality of individual cells, each having first and second terminals and
the cell connectors of the connector system as claimed in claim 1,
wherein for the common power-transmitting tap, electrical contacts are formed with a plurality of terminals of the individual cells of the battery module by a plurality of cell connectors of different successive cell connector types in the connector system, and
wherein n and m are consecutive integers.

14. A method for forming a power-transmitting tap of a battery module comprised of a plurality of individual cells, having terminals, the method comprising the steps of:
providing the connector system of claim 1, wherein n and m are successive integers;
nesting the plurality of cell connectors such that an n-th type cell connector is nested on top of an m-th type cell connector, and such that the m-th type cell connector directly contacts the terminals of the individual cells; and
forming electrical contacts with the terminals on the individual cells of the battery module, via the plurality of nested cell connectors.

15. An operating device, comprising:
a drive system; and
the battery module as claimed in claim 13, by which the drive system is supplied with electrical energy.

16. The operating device as claimed in claim 15, wherein the operating device is an electric or hybrid vehicle.

* * * * *